March 28, 1967  M. B. LUCAS  3,311,032

TEAR TAPE FOR PLASTIC PACKAGING MATERIALS

Filed Dec. 24, 1964

INVENTOR.
Malcolm B. Lucas

BY *Fredrick H. Braun*

ATTORNEY 3,311,032
TEAR TAPE FOR PLASTIC PACKAGING
MATERIALS
Malcolm B. Lucas, Cincinnati, Ohio, assignor to The Procter & Gamble Company, Cincinnati, Ohio, a corporation of Ohio
Filed Dec. 24, 1964, Ser. No. 420,974
3 Claims. (Cl. 93—1)

This invention relates to the art of plastic packages and more particularly, to the provision of a tear tape for packages made from plastic packaging films as well as a method of applying tear tapes to such packaging films.

The formation of packages from plastic film materials such as polyethylene, polypropylene and the like, has become one of the most common methods of packaging articles for sale in the retail trade. In spite of the many millions of pounds of plastic film materials used annually to package articles of all kinds, the art has lacked a universally satisfactory tear tape device applicable to virtually any plastic packaging film material and one which can be applied at commercially feasible packaging machine speeds.

For example, it has been proposed to heat seal a tear tape to the outside surface of a packaging material formed from a plastic film having thermoplastic properties. This can be accomplished but usually at the expense of thinning and/or weakening the packaging material itself. On the other hand, if the packaging material is neither thinned nor weakened, the heat seal approach limits the application of the tape to a particular direction with respect to the grain orientation in the parent film material if clean straight tears are desired. Additionally, the bonding of tear tapes solely by heat and pressure is a relatively slow process that does not lend itself easily to high speed production methods as commonly encountered in present day commercial packaging practices in order to operate on a competitive basis.

It is, therefore, a principal object of this invention to overcome all of the above-stated difficulties.

Another object of this invention is the provision of a tear tape for a plastic packaging film which can be applied to the external surface of the packaging film without weakening or thinning the parent packaging material.

A further object of the invention is to apply a tear tape on the outside surface of a plastic film packaging material that will satisfactorily tear open the packaging material regardless of the grain orientation in the parent film material with respect to the long dimension of the tear tape itself.

Still a further object of this invention is the provision of a method of applying a tear tape by means of hot-melt adhesive whereby tear tapes can be intermittently adhered to a continuous plastic packaging film at the rate of at least 300 tear tapes per minute.

The nature and substance of the invention can be summarized briefly as the provision of a package made from a plastic packaging film for enclosing at least one article and having a tear tape adhered thereto. The tear tape is adhered to the outer surface of the plastic packaging film by means of a hot-melt adhesive which is applied so that it forms a narrow elongated adhered area on the outside surface of the packaging film. The plastic packaging film can be formed around any article in making a package, and the tear tape may be adhered to the plastic film either before or after the package is formed. The package is opened simply by pulling on the tear tape so that the pulling force causes the plastic packaging film to be severed along the edges of the adhered area to allow access to the package contents.

While the specification concludes with claims particularly pointing out and distinctly claiming the subject matter regarded as forming the present invention, it is believed the invention will be better understood from the following description taken in connection with the accompanying drawing in which:

In utilizing the present invention, it has been found practical to apply tear tapes continuously at spaced intervals to a web of plastic packaging film material prior to the formation of the film into a succession of individual packages. The invention has equal merit and utility, however, when the tear tapes are individually applied to finished packages. Nevertheless, the application of the tear tapes to the continuously moving packaging film is considered of greater practical importance since this permits the adherence of tear tapes to the film at speeds in excess of 300 tear tapes per minute. Such a speed is substantially greater than the speeds that have been possible with previous known methods of applying tear tapes.

Figure 1:
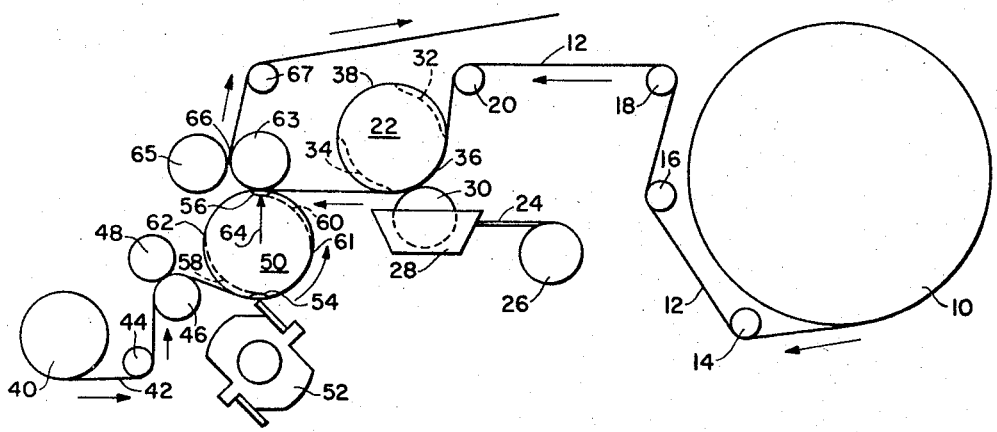
FIGURE 1 is a diagrammatic view of an apparatus for practicing the method of applying tear tapes at spaced intervals on a continuously moving plastic packaging film.

FIGURE 1 schematically illustrates the manner in which the tear tapes can be applied continuously to a web of plastic packaging material. A continuous web of plastic film material is withdrawn from the supply roll 10. The material stored on the supply roll 10 may be a plastic such as polyethylene, polypropylene, polyvinylchloride or any of the other plastic films which find widespread use in the packaging art. The web 12 withdrawn from the supply roll 10 is led over the idler rolls 14, 16, 18 and 20 to the recessed roll 22.

A solid hot-melt adhesive material 24 is fed in cord-like form from the spool 26 to the applicator 28. The adhesive is liquified in the applicator 28 by suitable heating means. The liquified adhesive is picked up by the applicator wheel 30 which is normally rotated continuously so that its peripheral surface moves in the same direction as the direction of movement of the web 12. The peripheral surface of the wheel 30 is greater than the speed of the moving web 12. The applicator wheel 30 is narrower than the overall width of the tear tapes which are adhered to the web 12 at spaced intervals.

The roll 22 is recessed at 32 and 34 so that the adhesive is applied in a narrow elongated area at spaced intervals on the web 12 as it passes over the high portions 36 and 38 of the roll 22. When either of the recessed portions 32 or 34 are in juxtaposition to the applicator wheel 30, the tension in the web 12 is such that the web 12 follows the smaller diameter of the recesses thereby causing the web 12 to break contact with the applicator wheel 30.

A supply roll of tear tape material 40 is provided. A web of tear tape material 42 is continuously withdrawn from the supply roll 40. The tear tape material may be composed of a laminate of several different plastic materials or it can be made of a non-plastic woven or unwoven fabric or virtually any of the common plastic materials such as polyethylene, polypropylene, etc. By way of example, it has been found that a laminate composed of polyethylene terephthalate, polyvinylidene chloride copolymer, and polyethylene is very satisfactory although it should be understood that the exact composition of the tear tape is not critical to the present invention.

The tear tape material 42 is led under the idler roll 44 and is fed forward by the metering wheels 46 and 48 to a slip-drag vacuum wheel 50. The slip-drag vacuum wheel 50 rotates continuously and causes the tape to adhere thereto by means of an internal vacuum. The wheel 50 is rotated so that its surface moves at about twice the speed of the moving tear tape material 42. A rotary cut-off knife 52 cuts individual tapes from the web 42. The wheel 50 is provided with oppositely disposed anvils 54 and 56. In addition, grooves 58 and 60 are provided. The grooves 58 and 60 are of diminishing depth leading from the anvils 54 and 56, respectively, to a point on the surface of the wheel 50 intermediate the anvils. The width of grooves 58 and 60 is such as to contain the tear tape material 42 and prevent lateral movement on the wheel 50. In addition, the grooves 58 and 60 serve as a guide for the free end of the tape material until a sufficient length has been withdrawn and is properly held against the slip-drag vacuum wheel 50.

The rotational speed of the wheel 50 is such that a tape will be cut off at the anvil 54 when the leading end of the tape is at the end 61 of the groove 60. The leading end of the web 42 will then slip in the groove 58 of the wheel 50 so that the next tape will have its leading end at the end 62 of the groove 58 when the tape is severed from the web at the anvil 56. Thus, as the wheel 50 is rotated, individual tear tapes are severed for application at spaced intervals on the web 12.

The rotation of the slip-drag vacuum wheel 50 is synchronized with the rotation of the recessed roll 22 so that a tape is delivered to the web 12 between the roll 63 and the wheel 50 coincidentally with the arrival of a length of web 12 to which a narrow elongated stripe of adhesive has been applied. An internal air jet 64 is provided opposite the wheel 12 which blows each successive tear tape from the wheel 50 and causes it to be applied against the adhesive stripe on the web 12 whereupon it is properly adhered when the adhesive solidifies. With some tape materials it may be desirable to use a pressure roll 65 having a nip 66 with the roll 63. This is particularly desirable when fabric tapes are used in order to get sufficient penetration of adhesive into the fabric tape material. The finished web is fed over the idler roll 67 and is led from there to any suitable location such as a rewind stand or a packaging machine which immediately uses the web material.

Figure 2:
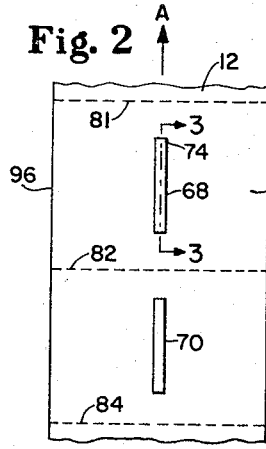
FIGURE 2 is a fragmentary view of the plastic packaging film after it has had tear tapes applied intermittently thereto.
Figures 3, 8:
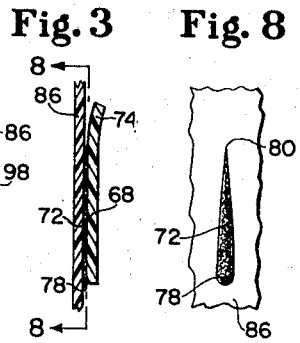
FIGURE 3 is a cross section taken on the line 3—3 of FIGURE 2 showing a tear tape bonded to the plastic packaging film.
FIGURE 8 is a fragmentary cross section taken on the line 8—8 of FIGURE 3 showing the pattern of the adhesive material as applied to the plastic packaging film.

FIGURE 2 illustrates the finished web showing individual tear tapes 68 and 70 applied thereto. It will be noted by referring to FIGURES 3 and 8 that the length of the bond 72 is somewhat less than the total length of the tape 68. This leaves a free end or pull tab 74 which can be grasped and pulled to apply the necessary tear force to sever the plastic packaging material. The arrow A in FIGURE 2 denotes the direction of movement of the web 12 when tear tapes are being applied. It will be noted that the pull tab 74 is preferably at the forward end of the web since it has been found that the area 78 near the trailing end of the adhesive bond will, at times, have an excessive amount of adhesive deposited as the applicator wheel 30 breaks contact with the web 12. As seen in FIGURE 8, the adhesive pattern 72 usually has the enlarged end 78 as previously described. The forward end of the pattern 72 comes to a point as at 80. Thus, it is much more satisfactory to pull the tape from the leading end since initiation of tearing is easier and more positive because of the narrow pointed end 80 in the adhesive pattern. If the tape is pulled from the end having the enlarged adhesive area 78, there can be a tendency for tape breakage because of the enlarged bonded area.

The adhesive 24 can be selected from various hot-melt adhesives. These are bonding agents which achieve a solid state and resultant strength by cooling, as contrasted with other adhesives which achieve the solid state through evaporation or removal of solvents. Prior to heating, a hot-melt adhesive is a thermoplastic, 100 percent solid material, all adhesive. Application of heat brings the material to the liquid state, and after removal of the heat, it sets by simple cooling. The preferred adhesive for use in this invention is one which is solid and yet flexible at room temperature and which gradually softens to a fluid stage when heated. The adhesive becomes sufficiently hot and soft for application at a temperature of from about 375° F. to a maximum temperature which will not damage either the adhesive, the tape material or the packaging film. Preferably the adhesive is applied in a temperature range of from about 490° F. to about 510° F. Furthermore, the preferred adhesive should be resistant to water, fats, oils, weak acids and alkalis, and should be non-brittle and stronger than paperboard from −50° F. to +150° F. A hot-melt adhesive which has been found satisfactorily in practicing the present invention is sold by United Shoe Machinery Company under the trade name of Thermogrip Adhesive #1312.

Numerous hot-melt adhesives were examined in reducing the invention to practice. It was discovered that although many had similar properties, none were entirely satisfactory and consistent in making the bond between the film and the tear tape except the above-mentioned Thermogrip Adhesive #1312. This adhesive was prepared in accordance with the method described in Example I of U.S. Patent 2,894,925 granted on July 14, 1959. The composition of the adhesive was as follows:

| | Parts by weight |
|---|---|
| Polyethylene having an average molecular weight of 15,000 | 40 |
| Butyl rubber copolymer of about 98 parts isobutylene and 2 parts isoprene | 25 |
| B-pinene polymer resin—melting point 125° C. (Piccolite S-125) | 35 |
| Antioxidant | 2 |

This adhesive was found very satisfactory in adhering a 2 mil polyethylene web of packaging material to a tear tape material composed of a three-layer laminate having an outer layer of .5 mil polyethylene terephthalate, an intermediate layer of .1 mil polyvinylidene chloride and another outer layer of 3 mil polyethylene. The polyethylene layer of the laminate was bonded to the packaging material.

Figure 4:
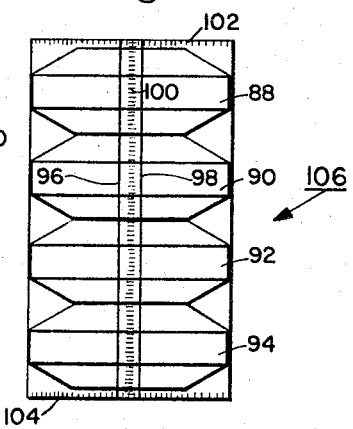
FIGURE 4 is an elevation of a package made from the film shown in FIGURE 2 showing the side of the package opposite to the tear tape.

Referring again to FIGURE 2, the web 12 can be severed along the dotted lines 81, 82, and 84 to form individual packaging wrappers. For example, the wrapper 86 between the dotted lines 81 and 82 can be severed and sealed to form a package around objects such as the detergent tablets 88, 90, 92 and 94 shown in FIGURE 4. This package can be formed and completed by overlapping the edges 96 and 98 of the wrapper 86 and then forming the vertical heat seal 100 when the web 12 is made from a heat-sealable thermoplastic material. Similarly, the ends of the package can then be finished by heat sealing the ends at 102 and 104.

Figure 5:
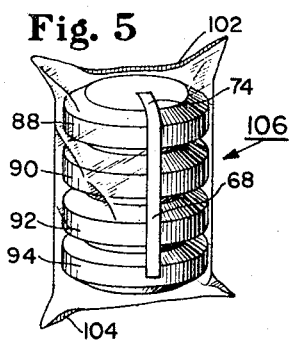
FIGURE 5 is a perspective of the package of FIGURE 4 showing the tear tape side.
Figure 6:
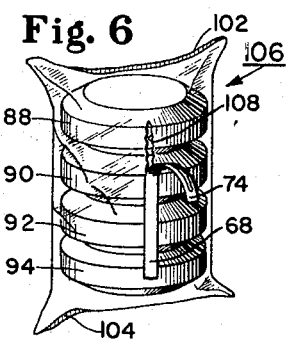
FIGURE 6 is a view similar to FIGURE 5 wherein the tear tape is shown when it has partially opened the package.
Figure 7:
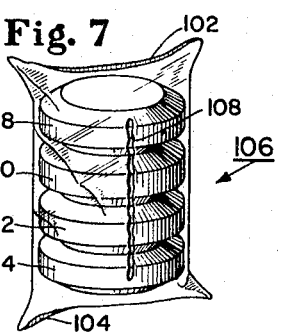
FIGURE 7 is a view similar to FIGURE 6 showing the package after the tear tape has completed tearing an opening in the package so that the contents of the package are accessible.

In FIGURE 5, the finished package 106 is illustrated on the side opposite the seal 100. It will be noted that the tear tape 68 is fully exposed including the pull tab 74 since the package is formed so that the tear tape 68 is on an external surface when finished. FIGURE 6 illustrates the package of FIGURE 5 after a pulling force has been applied to the pull tab 74 to partially remove the tear tape 68. The adherence of the tape at the bond area 72 (FIGURE 3) is such that it causes the removal of a narrow portion of the packaging material by means of clean and straight tears to form the slot 108. When the tear tape has been fully removed, the full length of the slot 108 is exposed as shown in FIGURE 7. When the package is in this condition, the individual articles can be very easily removed as will be apparent from the drawing.

Polyethylene and similar heat-sealable materials have a grain. These materials can be formed into sheets or webs by an extrusion process. The extrusion process plus the tensile load on the web when it is withdrawn from the extrusion die tends to orient the grain in the direction of extrusion which is known in the art as the "machine direction." In FIGURE 2, the grain orientation of the polyethylene web 12 would be in the direction of the arrow A. It will be noted that the tapes 68 and 70 are adhered with the long dimension of each substantially in the same direction as the direction of grain orientation. It was found that the use of an adhesive to adhere the tear tape as described herein will provide a satisfactory opening device regardless of the direction of grain orientation in the packaging film with respect to the long dimension of the tear tape.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:

1. A method for applying tear tapes at predetermined spaced intervals to a continuous web of plastic packaging material comprising the steps of:
    (a) withdrawing a continuous web of tear tape material from a supply roll and severing the web into a plurality of successive tear tapes having a predetermined and substantially uniform length,
    (b) withdrawing a continuous web of grained plastic packaging material from a supply roll such that its direction of grain orientation corresponds to its direction of movement,
    (c) heating a hot-melt adhesive to a temperature of from about 375° F. to a temperature which will not cause damage to any of the components comprising the adhesive, the plastic packaging material and the tear tape material,
    (d) applying successive elongated stripes of the hot-melt adhesive in narrow areas at spaced intervals on the web of plastic packaging material such that both the width and length of each adhesive area is less than the corresponding width and length of the tear tapes, said adhesive being applied such that successive stripes are in longitudinal alignment,
    (e) adhering a tear tape to each successive stripe of adhesive such that one end of the tear tape coincides with one end of the adhesive stripe thereby leaving the other end of the tear tape free to form a pull tab.

2. A method for applying tear tapes at predetermined spaced intervals as in claim 1 including the step of applying the hot-melt adhesive in a pattern which is enlarged at one end and tapers forward to a point, and applying a tear tape thereafter such that the pull tab portion extends forward from the pointed end of the adhesive area.

3. A method for applying tear tapes at predetermined spaced intervals as in claim 2 including the step of applying the stripe of adhesive such that its long dimension coincides with the direction of grain orientation in said plastic packaging material.

References Cited by the Examiner
UNITED STATES PATENTS

| | | | |
|---|---|---|---|
| 2,268,474 | 12/1941 | Chalmers | 93—1 |
| 2,334,381 | 11/1943 | Bronander | 93—1 |
| 2,760,414 | 8/1956 | Cornock et al. | 93—1 X |
| 2,991,000 | 7/1961 | Spees | 229—51 |
| 3,012,481 | 12/1961 | Hughes | 93—1 |
| 3,098,601 | 7/1963 | Anderson et al. | |

References Cited by the Applicant
UNITED STATES PATENTS

| | | |
|---|---|---|
| 3,088,379 | 5/1963 | Dickinson et al. |

BERNARD STICKNEY, *Primary Examiner.*

GEORGE O. RALSTON, *Examiner.*